(12) United States Patent
Libsch et al.

(10) Patent No.: US 6,476,787 B1
(45) Date of Patent: Nov. 5, 2002

(54) MULTIPLEXING PIXEL CIRCUITS

(75) Inventors: Frank R. Libsch, White Plains; Kai R. Schleupen, Yorktown Heights, both of NY (US); Robert L. Wisnieff, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/186,313

(22) Filed: Nov. 4, 1998

(51) Int. Cl.[7] ................................................ G09G 3/36
(52) U.S. Cl. ........................ 345/92; 345/87; 345/100; 345/204; 349/48; 349/139
(58) Field of Search .......................... 345/90, 92, 103, 345/204–206, 208, 211–214, 50, 51, 55, 87, 93, 98–100; 349/27, 28, 46–48, 139, 140, 149

(56) References Cited

U.S. PATENT DOCUMENTS

| | | | |
|---|---|---|---|
| 4,870,396 A | * 9/1989 | Shiels | 340/719 |
| 5,120,964 A | 6/1992 | Wieczorek | |
| 5,175,446 A | 12/1992 | Stewart | |
| 5,627,557 A | * 5/1997 | Yamaguchi et al. | 345/90 |
| 5,641,974 A | 6/1997 | den Boer et al. | |
| 5,790,213 A | * 8/1998 | Sasaki et al. | 349/48 |
| 5,828,429 A | * 10/1998 | Takemura | 349/143 |
| 5,844,538 A | * 12/1998 | Shiraki et al. | 345/98 |
| 5,903,249 A | * 5/1999 | Koyama et al. | 345/92 |
| 5,952,989 A | * 9/1999 | Koyama | 345/92 |
| 5,982,469 A | * 11/1999 | Awane et al. | 349/151 |
| 6,011,530 A | * 1/2000 | Kawahata et al. | 345/90 |
| 6,115,017 A | * 9/2000 | Mikami et al. | 345/92 |
| 6,295,054 B1 | * 9/2001 | McKnight | 345/205 |
| 6,310,594 B1 | * 10/2001 | Libsch et al. | 345/100 |

* cited by examiner

Primary Examiner—Richard Hjerpe
Assistant Examiner—Henry N. Tran
(74) Attorney, Agent, or Firm—F. Chau & Associates, LLP

(57) ABSTRACT

An active matrix display in accordance with the present invention includes a plurality of pixels arranged in an array. At least two transistors are included for coupling to each pixel, and the transistors are positioned within the array for switching the pixels on and off according to data and gate signals. A plurality of control lines are coupled to the transistors of each pixel such that the control lines provide multiplexing for at least one of data signal multiplexing and gate signal multiplexing.

42 Claims, 14 Drawing Sheets

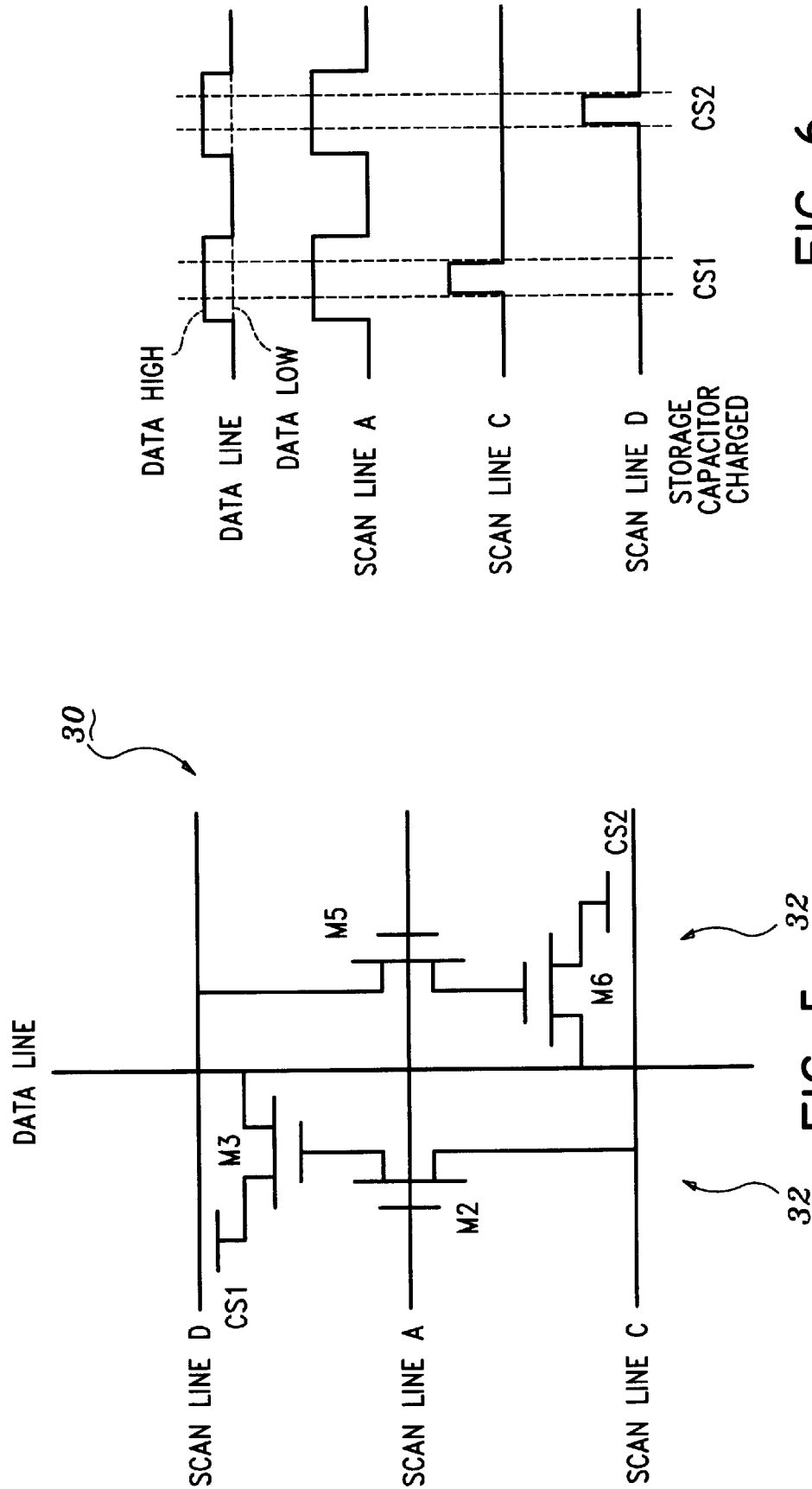

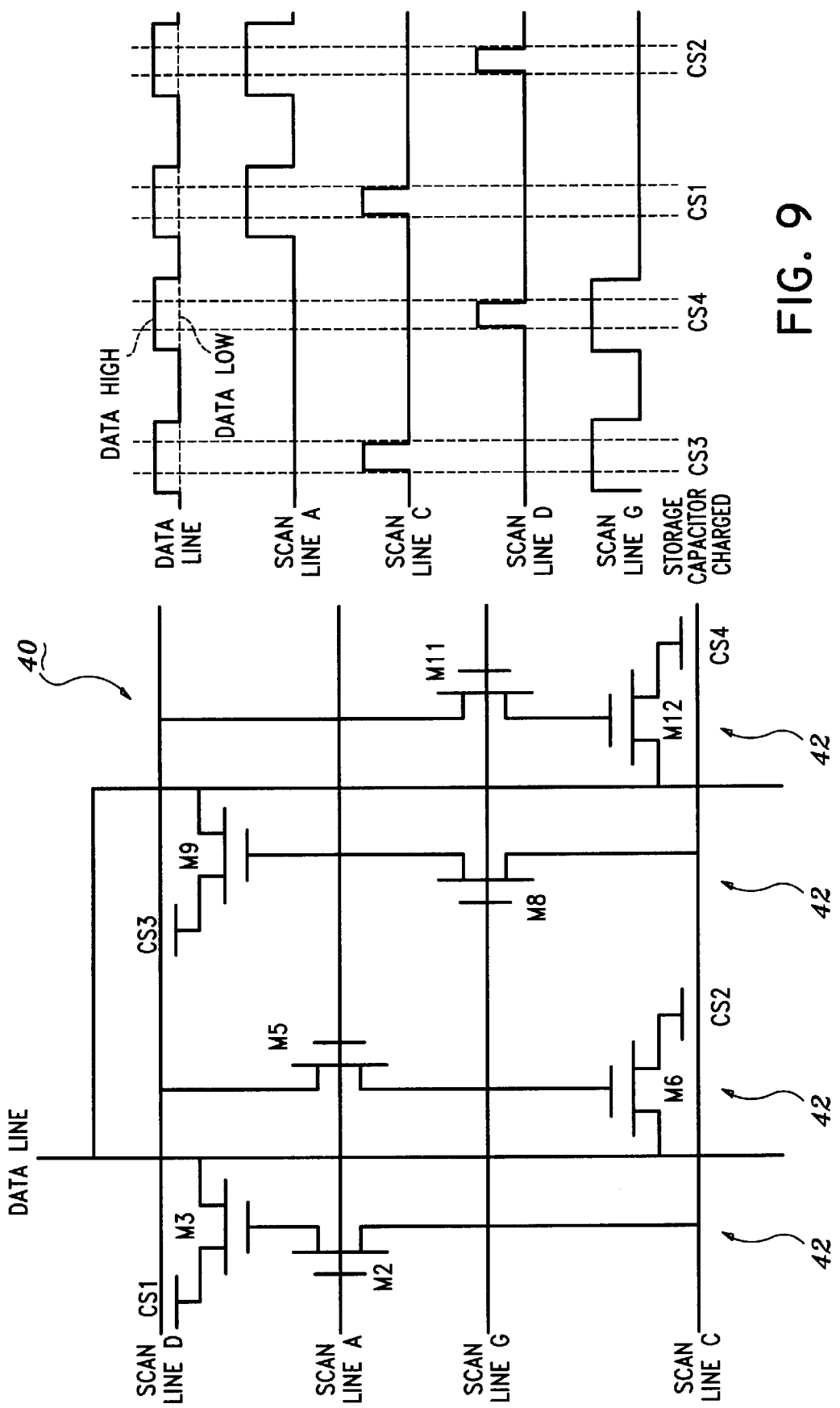

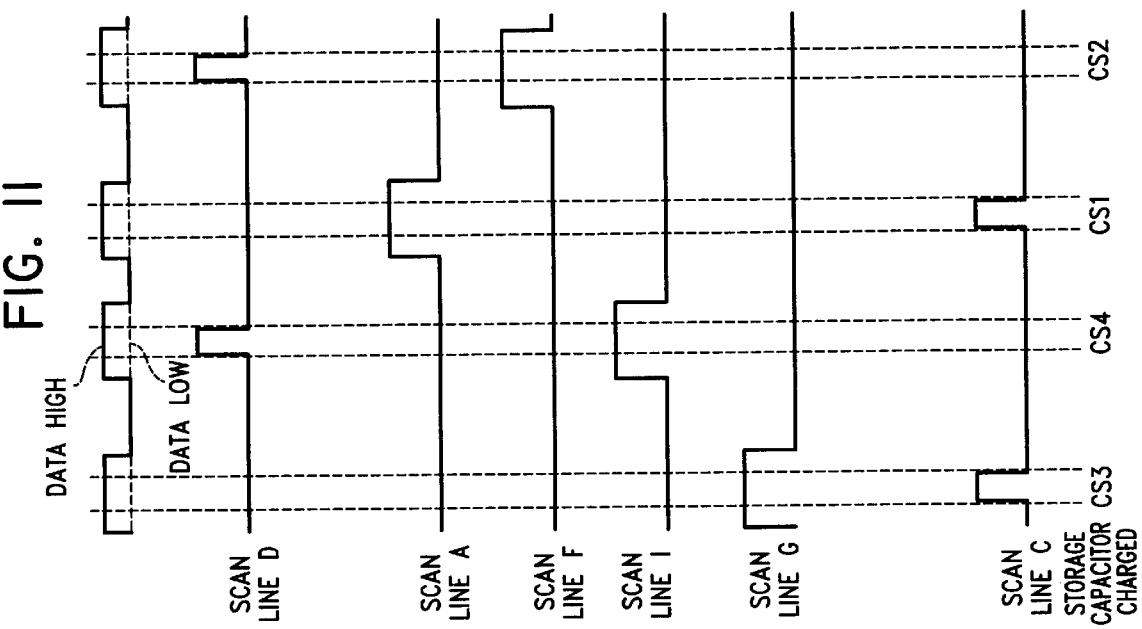
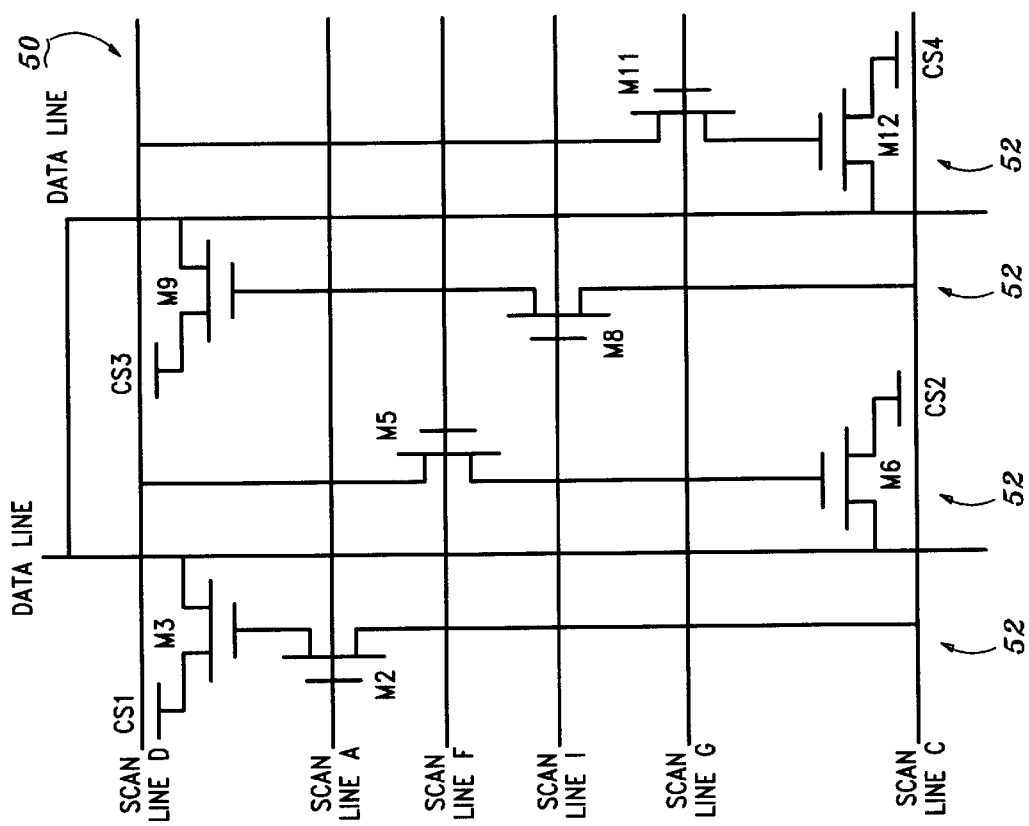

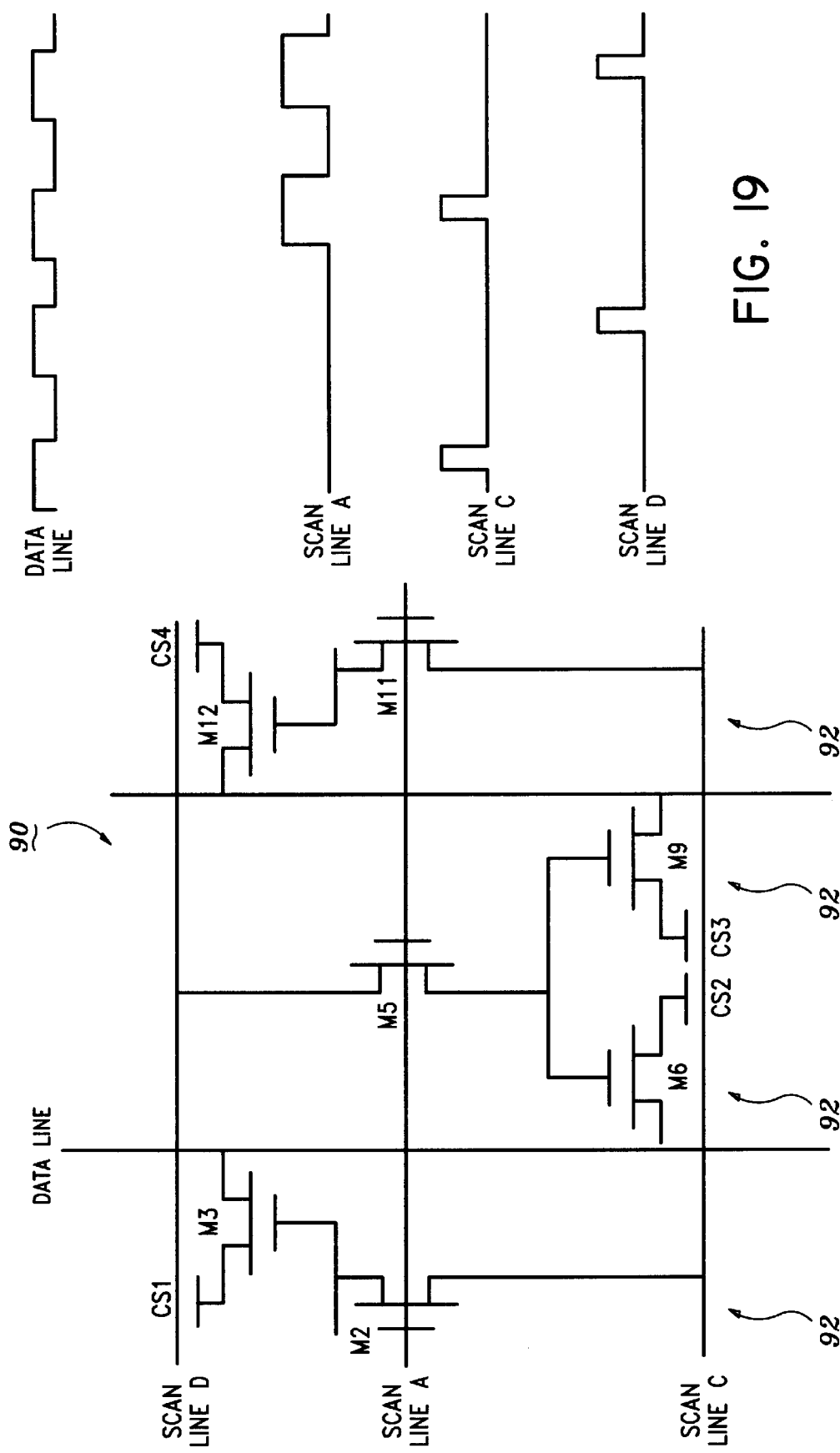

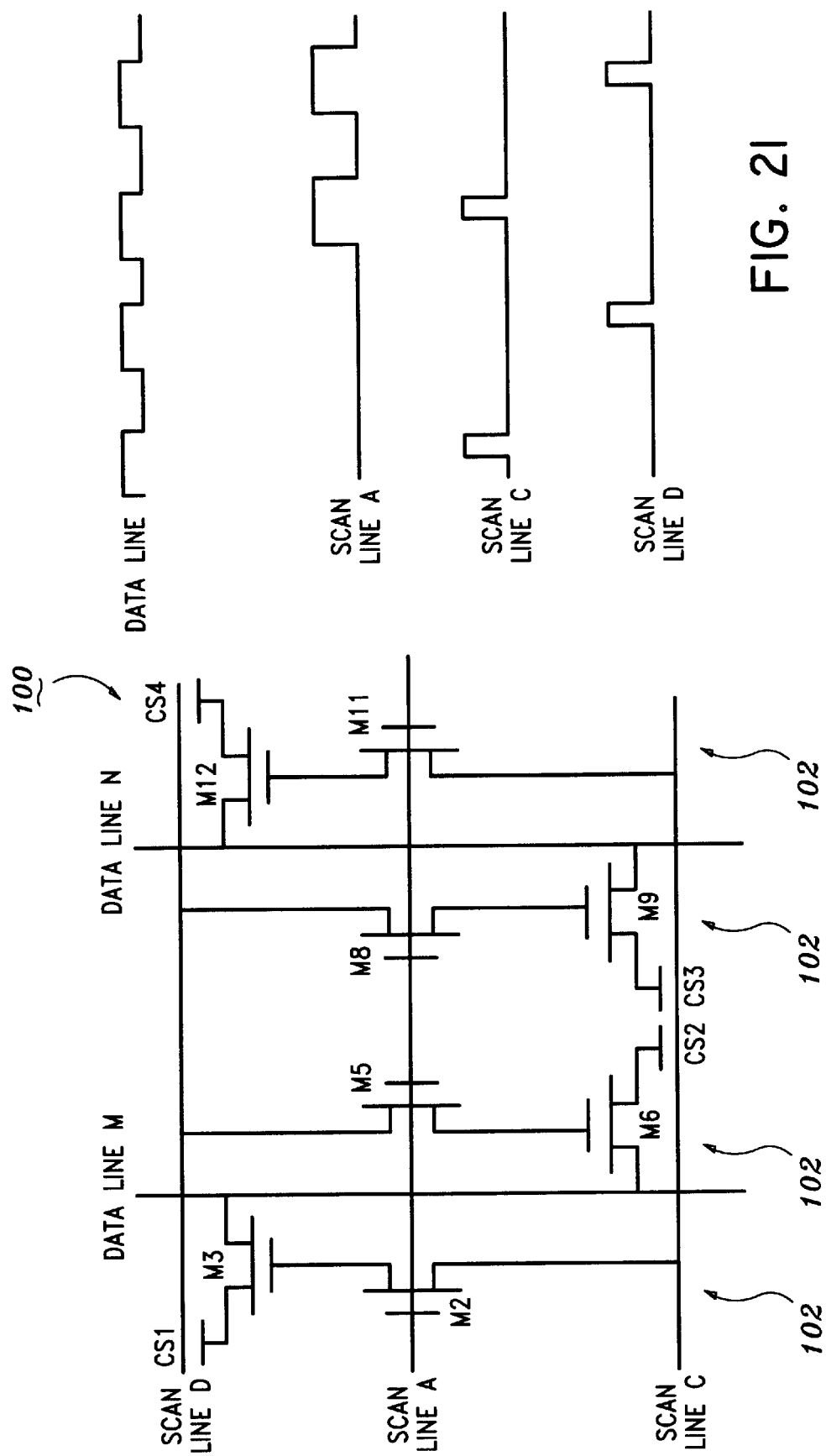

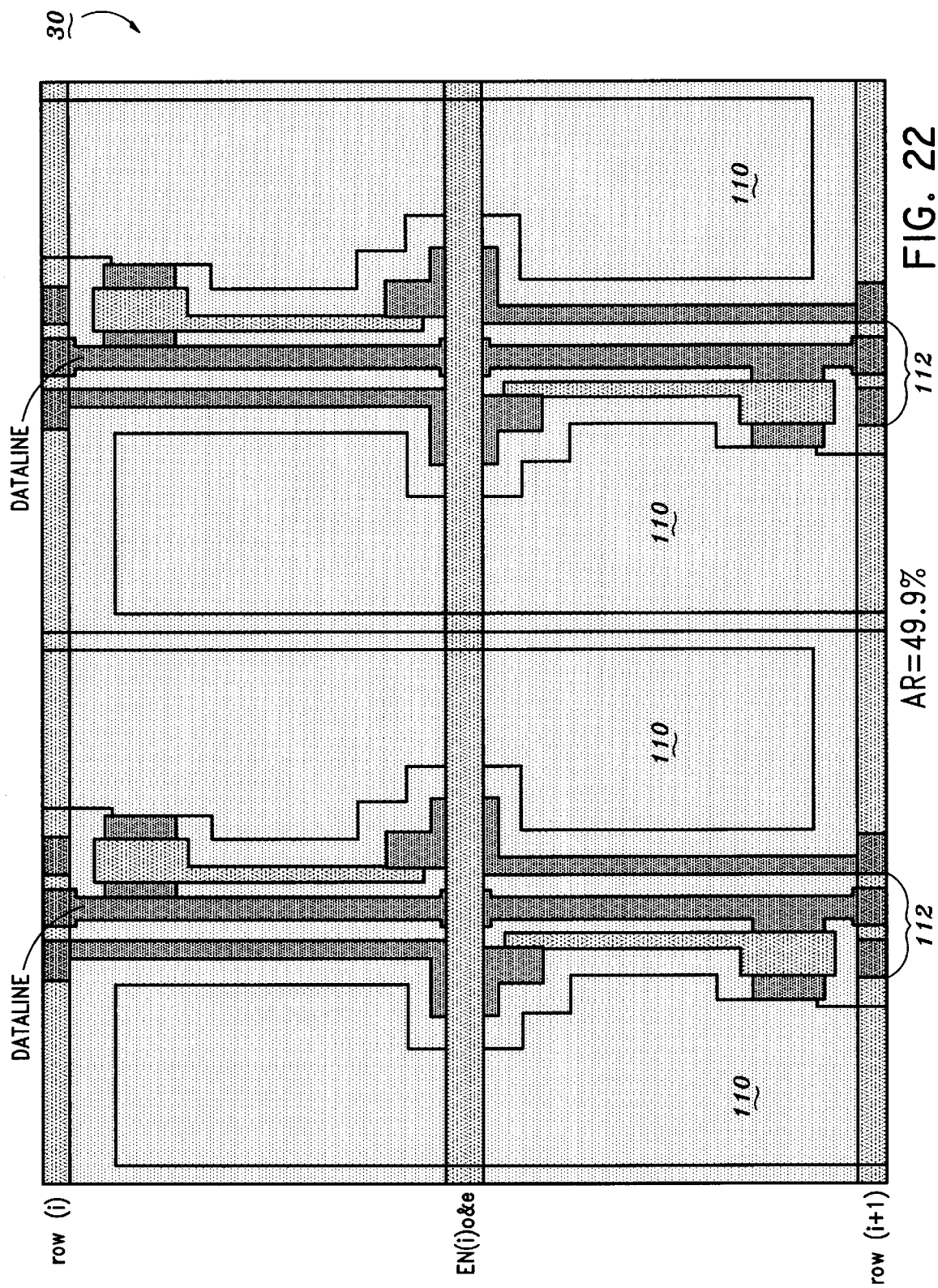

US 6,476,787 B1

MULTIPLEXING PIXEL CIRCUITS

BACKGROUND OF THE INVENTION

1. Field of the Invention

The present invention relates to pixel display circuits and, more particularly, to a pixel display circuit having integrated data and gate multiplexing capabilities.

2. Description of the Related Art

Due to poor charging ability in amorphous silicon thin film transistors (a-Si TFTs) resulting from inherently low TFT transconductance, all commercially available a-Si TFT liquid crystal displays (LCD) include an array of pixel elements connected with row and column metal lines. The row and column drivers require higher transconductance devices. The row and column drivers typically include crystalline silicon technology and are separately fabricated and attached to the a-Si TFT LCDs. Over the years, there have been attempts at integrating some level of multiplexing between the attached crystalline silicon drivers and the pixel array. See for example, U.S. Pat. No. 5,175,446 to R. Stewart. In this way, the number of crystalline drivers needed could be reduced. These prior art designs follow a circuit approach that is commonly used in crystalline silicon circuit designs. Even simple 2:1 level multiplexing schemes at the edge of a pixel array have not been implemented for a-Si TFT LCD circuits. Although not realized for direct view a-Si TFT LCDs, multiplexer circuits have been implemented with some success in smaller displays for example, in light valves, and in poly-silicon technology. Poly-silicon TFTs make it possible to realize a higher transconductance TFT. However, implementing poly-silicon technology on larger and/or high resolution TFT LCDs leads to an unacceptably higher RC load and/or higher bandwidth rates of the rows and columns.

Therefore, a need exists for a circuit for providing integrated data and gate multiplexing for active matrix LCDs without impacting acceptable display limits. A further need exists for a reduction in data drivers and gate drivers to reduce costs of these displays.

SUMMARY OF THE INVENTION

An active matrix display in accordance with the present invention includes a plurality of pixels arranged in an array. At least two transistors are included for coupling to each pixel, and the transistors are positioned within the array for switching the pixels on and off according to data and gate signals. A plurality of control lines are coupled to the transistors of each pixel such that the control lines provide multiplexing signals for at least one of data signal multiplexing and gate signal multiplexing. In one embodiment, the transistors are disposed on a substrate and the pixels are formed over the transistors.

Another active matrix display in accordance with the present invention includes a plurality of pixels arranged in an array including rows and columns. At least two transistors are coupled to each pixel, and the transistors are positioned within the array for switching the pixels on and off. A plurality of data lines running substantially parallel to the columns and a plurality of scan lines running substantially parallel to the rows are also included. The data lines and scan lines are coupled to the transistors of the pixels such that the data lines provide data multiplexing for each pixel and the scan lines provide gate multiplexing for each pixel.

In alternate embodiments of the displays in accordance with the invention, one of the at least two transistors may be shared between adjacent pixels to further reduce gate or data drivers. The pixels may modulate light in a transmissive mode and/or a reflective mode. The array preferably includes rows and columns and the control lines may select the pixels in different rows simultaneously. The simultaneously selected pixels may share a data line. The control lines may include data lines and the simultaneously selected pixels may each use a different data line. The control lines may include scan lines and/or capacitance storage lines. The control lines may be coupled to the transistors by a low impedance contact path which may include a metal, polycrystalline silicon, a capacitor or a combination thereof. The display may include a liquid crystal display, and the transistors preferably include thin film transistors.

The data multiplexing may include L:1 multiplexing where L is an integer greater than one. The gate multiplexing may include m:1 multiplexing where m is an integer greater than one. The data lines may select pixels in different rows simultaneously, or the pixels may share a data line. The display may further include logic circuitry for controlling the multiplexing in accordance with control signals.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 5 is a schematic diagram of another pixel circuit showing two TFTs per pixel in accordance with the present invention;

FIG. 6 is a timing diagram for the circuit of FIG. 5 in accordance with the present invention;

FIG. 8 is a schematic diagram of another embodiment of the pixel circuit of FIG. 5 showing an additional scan line to achieve 4:1 data multiplexing in accordance with the present invention;

FIG. 9 is a timing diagram for the circuit of FIG. 8 in accordance with the present invention;

FIG. 10 is a schematic diagram of a pixel circuit having a four pixel layout with a common data line and two TFTs per pixel in accordance with the present invention;

FIG. 11 is a timing diagram for the circuit of FIG. 10 in accordance with the present invention;

FIG. 18 is a schematic diagram of another pixel circuit effectively having one and one half TFTs per pixel due to a shared TFT between adjacent pixels in accordance with the present invention;

FIG. 19 is a timing diagram for the circuit of FIG. 18 in accordance with the present invention;

FIG. 20 is a schematic diagram of another embodiment of a pixel circuit showing a common data line and two TFTs per pixel in accordance with the present invention;

FIG. 21 is a timing diagram for the circuit of FIG. 20 in accordance with the present invention;

FIG. 22 is a top plan view of a semiconductor device layout implementing the present invention.

DETAILED DESCRIPTION OF PREFERRED EMBODIMENTS

The present invention relates to liquid crystal display circuits and, more particularly, to circuits for providing integrated data and gate multiplexing. Advantageously, the present invention provides gate and data line multiplexing functions from circuitry implemented within the pixel rather than from circuitry at the data or gate line ends. The multiplexing functions are provided without impact to acceptable standards of the displays. The present invention does not follow the prior art schemes of implementing crystalline silicon multiplexer designs with amorphous silicon thin film transistors (TFTs), nor does the present invention follow the prior art scheme of placing the multiplexers between the pixel array and the externally attached crystalline silicon drivers.

The present invention reduces the RC load for driving a pixel to about the load within the pixel itself, whereas the prior art needed to drive the full load of the gate or data line to accomplish gate or data multiplexing. This may be implemented by employing a TFT gate of minimum length and width as described hereinbelow.

Figure 2:
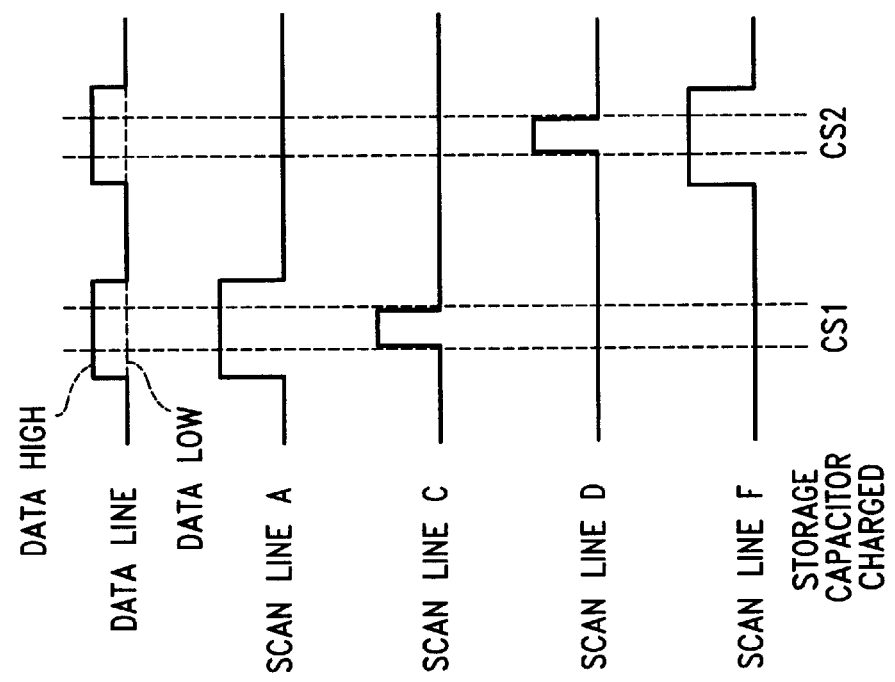
FIG. 2 is a timing diagram for the circuit of FIG. 1 in accordance with the present invention.
Figure 1:
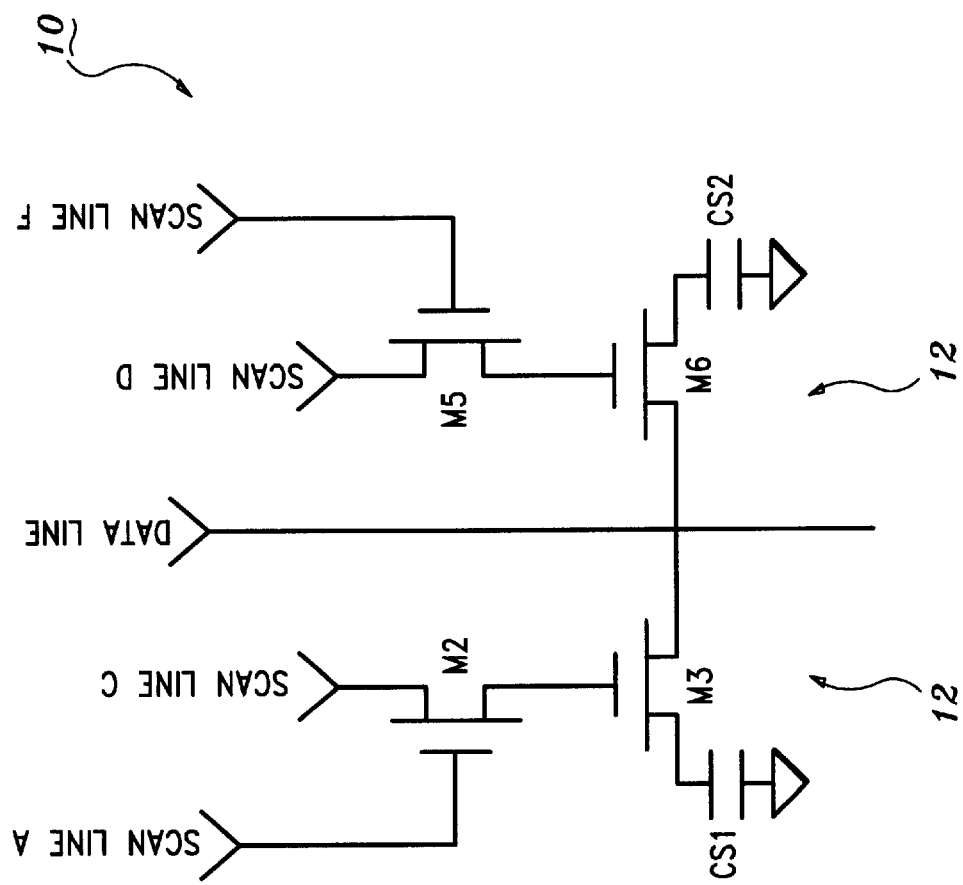
FIG. 1 is a schematic diagram of a pixel circuit showing two TFTs per pixel in accordance with the present invention.

Referring now in detail to the figures in which like numerals represent the same or similar elements and initially to FIG. 1, a schematic diagram of a two pixel circuit 10 in accordance with the present invention is shown. Pixel circuit 10 includes two pixels 12 with a common data line (DATA LINE) and two thin film transistors (TFTs)per pixel 12, M2 and M3 and MS and M6, respectively. Enabling TFTs M2 and MS are activated by scan line A and scan line F, respectively. Data line signal transfer TFTs M3 and M6 provide access of DATA LINE to pixel capacitors CS1 and CS2. M3 and M6 are enabled by scan line C and scan line D, respectively. Advantageously, all TFTs shown in FIG. 1 are located at pixels 12. An illustrative timing diagram is shown in FIG. 2 to show the states of pixel circuit 10 of FIG. 1. Storage capacitors CS1 and CS2 are charged when DATA LINE and scan lines A, C, D and/or F have achieved the states (i.e., data high and data low) shown in FIG. 2.

Figure 4:
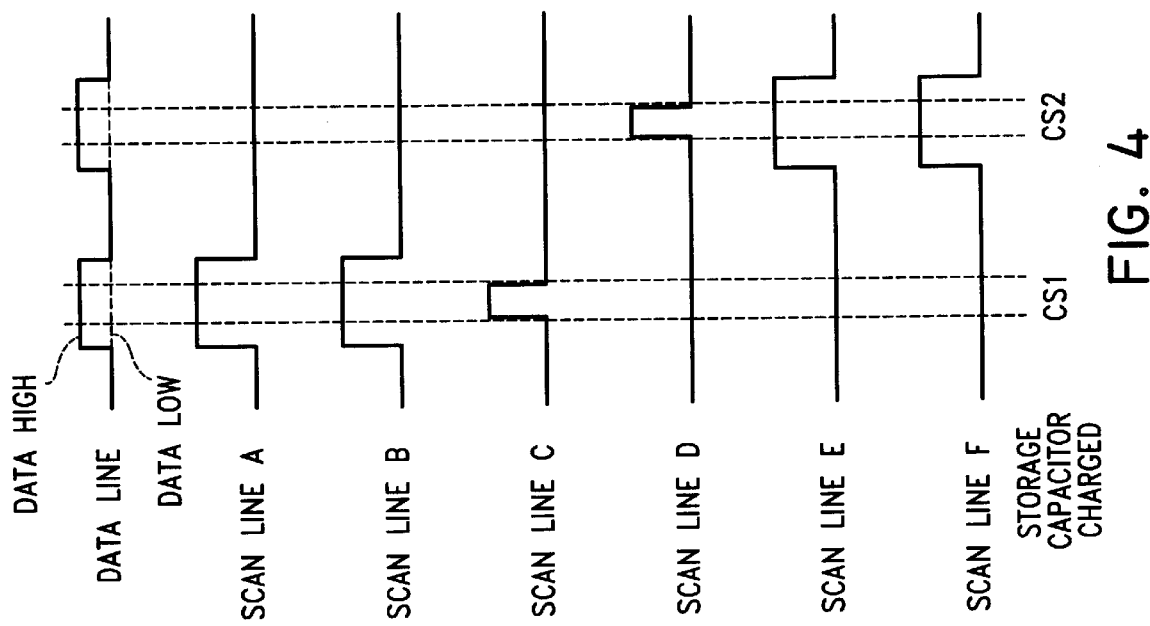
FIG. 4 is a timing diagram for the circuit of FIG. 3 in accordance with the present invention.
Figure 3:
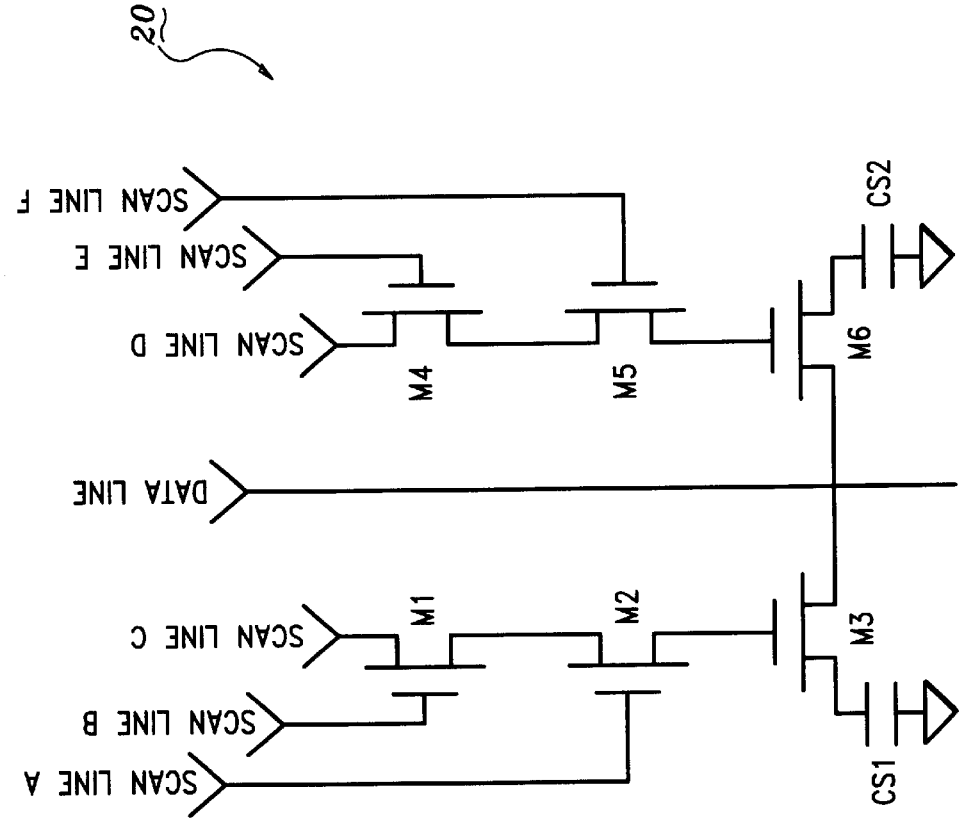
FIG. 3 is a schematic diagram of a pixel circuit showing three TFTs per pixel and additional scan lines in accordance with the present invention.

Referring to FIG. 3, a schematic diagram shows an alternate embodiment of a pixel circuit shown as pixel circuit 20. Circuit 20 includes additional enabling TFTs M1 and M4. TFTs M1 and M4 are enabled by signal line B and signal line E, respectively. In a similar way, additional enabling TFTs may be added in series to M2 and M5 to provide a similar function. The additional TFTs in series with M2 and M5 for providing, among other things, a higher level of gate line multiplexing, more scan lines through each pixel 12 and an integer number of threshold drops from scan line C (or D) voltage to a gate of TFT M3 (or M6). FIG. 4 illustratively presents a timing diagram for circuit 20 of FIG. 3.

Referring to FIG. 5, another embodiment of the present invention is shown as pixel circuit 30. The number of scan line are reduced to three per pixel. In circuit 30, scan line D may be shared with a previous row of pixels while scan line C may be shared with a next row of pixels. Circuit 30 provides a more efficient layout of pixels and thus maximizes aperture area.

An illustrative timing diagram is shown for circuit 30 in FIG. 6. Referring now to FIGS. 5 and 6, a mode of operation is provided where scan line A pulse high width overlaps scan line C and scan line D pulses. The significance of this is that the falling edge of scan line A pulses are completed after that of scan line C or scan line D falling edges so as to ensure that a gate node of M3 or M6 is discharged and will not act as a charge storage node which would prevent M3 and/or M6 from turning off. Further only two scan lines are needed to turn a pixel on, for example, scan line A and D or scan line A and C. The third scan line provides a multiplexing capability in accordance with the present invention. In this example, a shared common DATA LINE between pixels 32 provides a 2:1 data multiplexing function, and the three scan lines A, C and D provide an m:1 gate demultiplexing function, where m is an integer greater than 1.

The pulse width on scan line A is larger than that on scan line C or D. This implementation provides scan line pulse flexibility and in general, scan line pulse widths and relative positions may be different between scan line A and scan line D and scan line C. For example, when scan line A is high, enable TFTs M2 and M5 are turned on. Scan line C and D voltages are placed on gates of TFTs M3 and M6, respectively. If scan line C (or D) is high, TFT M3 (or M6) conducts and transfers a data voltage to CS1 (or CS2). If scan line C (or D) is low, TFT M3 (or M6) does not conduct, and the data line voltage is not transferred to CS1 (or CS2). The timing diagram of FIG. 6 is for normal scan line multiplexing. For simplicity, a liquid crystal voltage is not shown, however the liquid crystal voltage is connected across a source of TFT M3 (M6) where CS1 (CS2) is connected and the other node is connected to a common plate or transparent electrode voltage. The transparent electrode preferably including indium tin oxide.

Figure 7A:
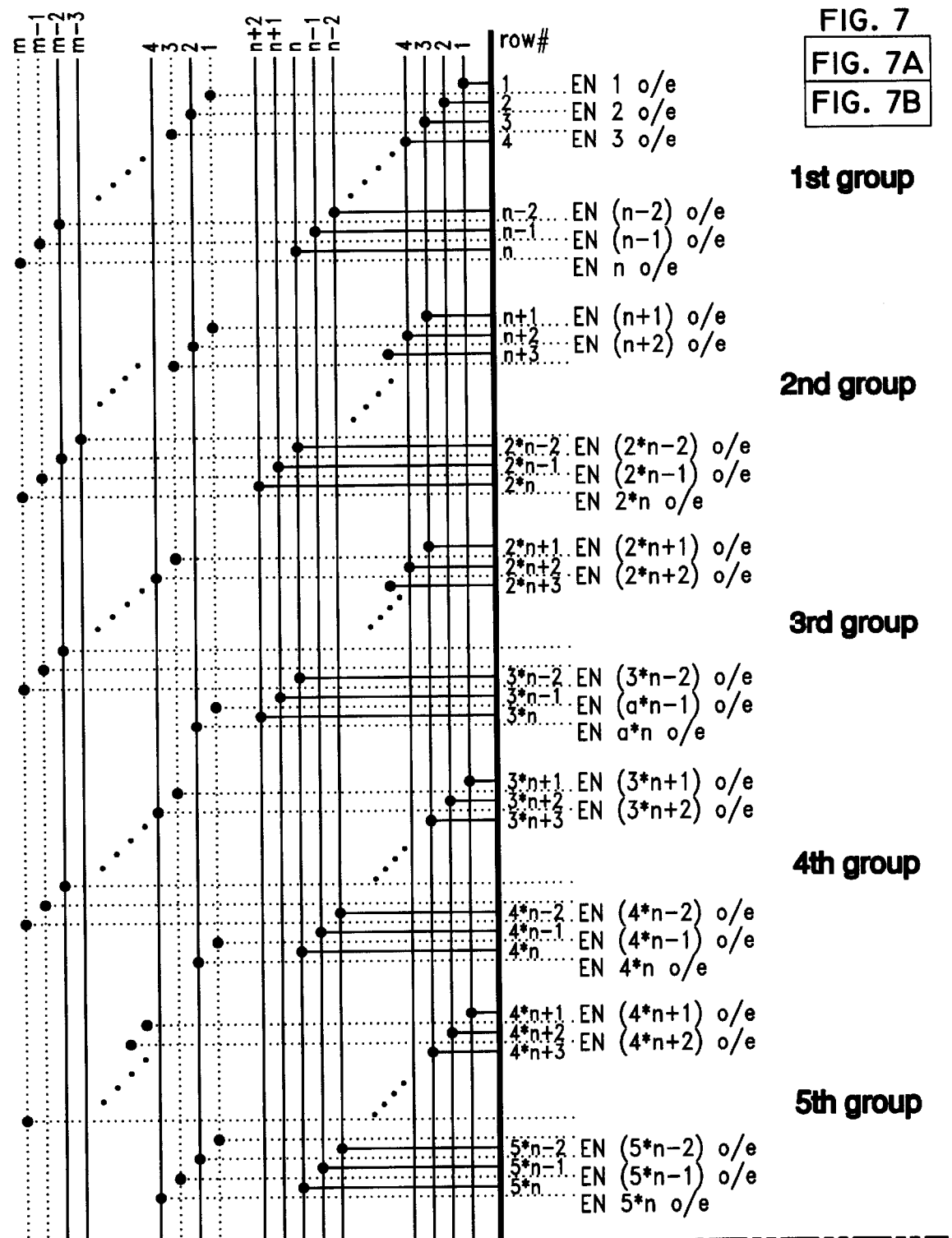
FIG. 7 is a schematic diagram showing a fanout wiring for a demultiplexer in an active matrix array in accordance with the present invention.
Figure 7B:
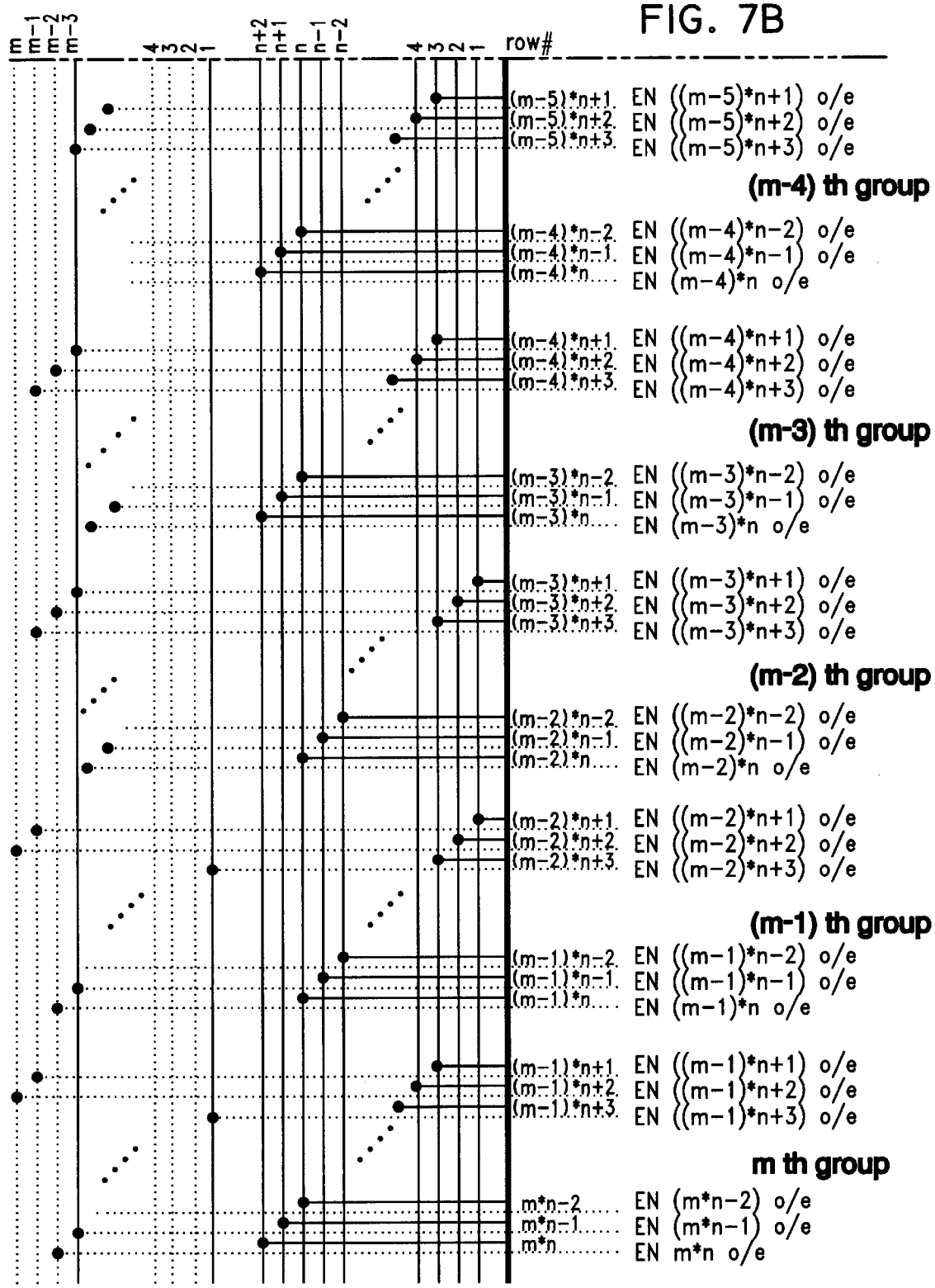

Referring to FIG. 7, an illustrative example of row fan-out wiring for gate demultiplexing is shown. An m:1 gate multiplexing function is provided. Signal line labeled "EN1 o/e" through EN m*n o/e" represent pulses to the gates of the enable TFTs M2 and M5. The odd (M2) and even (M5) pixel access TFTs are designated by the nomenclature "o" and "e". Also, "row #"1 through m*n represent scan lines to which the storage capacitors (i.e., CS1 and CS2) overlap onto. In one example, if m=n, and XGA and SXGA color displays are used, gate driver outputs may be multiplexed to approximately 28:1 and 32:1, respectively.

The above figures have shown gate driver outputs being multiplexed 2:1, however, higher data line is possible through the introduction of other scan lines. Referring to FIG. 8, circuit 30 of FIG. 5 is shown as circuit 40 having an additional scan line G to provide increased data multiplexing from 2:1 to 4:1. Circuit 40 includes four pixels 42. The TFTs M8, M9, M11 and M12 function similarly to TFTs M2, M3, M5 and M6. CS3 and CS4 function similarly to CS1 and CS2. By repeating the circuit pattern of FIG. 8, a circuit is provided in accordance with the present invention which incorporates m:1 gate demultiplexing and L:1 data demultiplexing, where m and L are integers greater than 1. FIG. 9 illustratively shows a timing diagram for circuit 40.

Referring to FIG. 10, a schematic diagram of a circuit 50 is shown. Circuit 50 includes a common DATA LINE and two TFTs per pixel 52. Circuit 50 is a 4:1 data demultiplexing representation of circuit 10 of FIG. 1. Scan lines G and I are added to accomplish this. The TFTs M8, M9, M11 and M12 function similarly to TFTs M2, M3, M5 and M6, respectively. CS3 and CS4 function similarly to CS1 and CS2. FIG. 11 illustrates an example of a timing diagram for circuit 50.

Figures 12, 13:
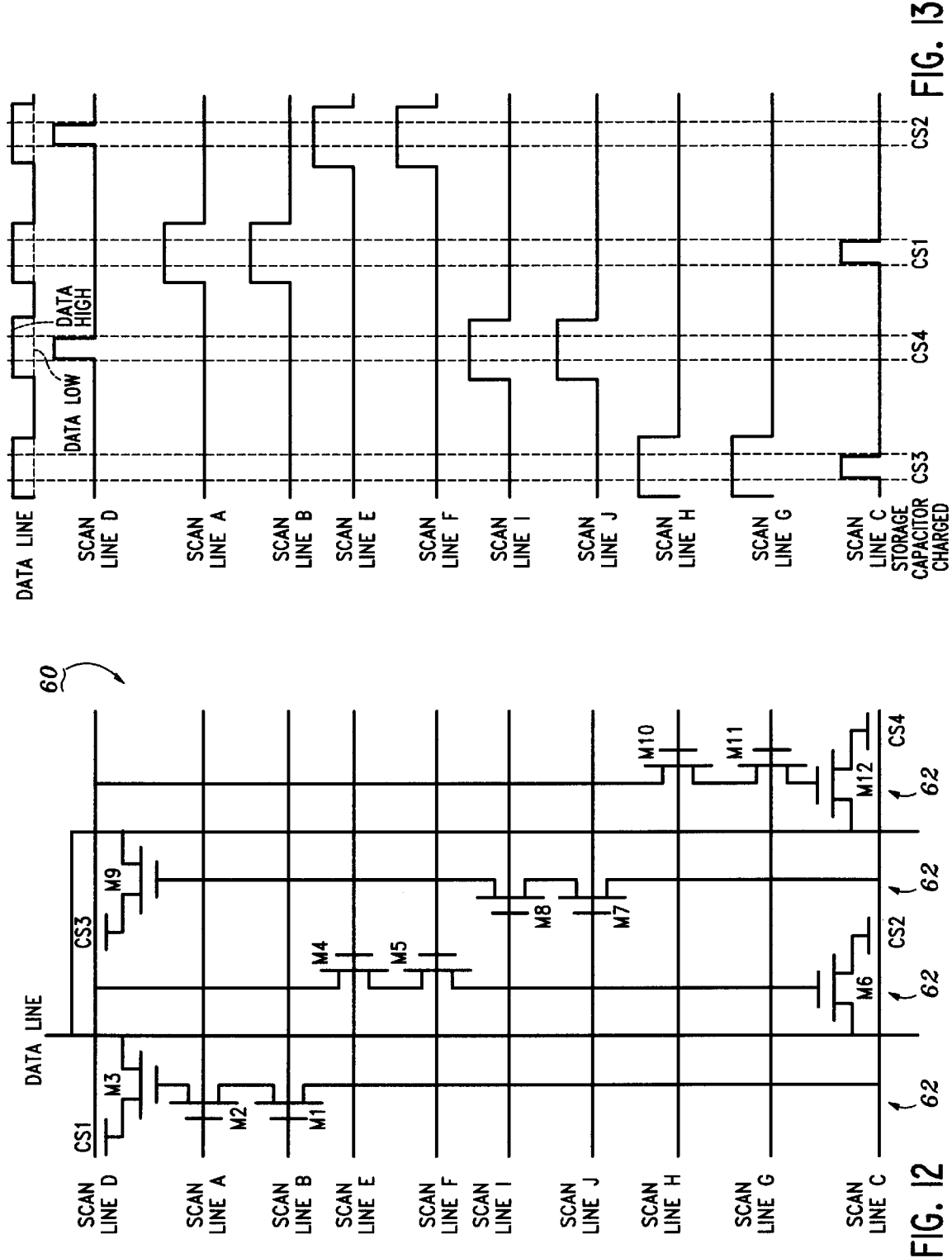
FIG. 12 is a schematic diagram of another embodiment of the pixel circuit of FIG. 3 having a four pixel layout with a common data line and two TFTs per pixel for providing 4:1 data demultiplexing in accordance with the present invention.
FIG. 13 is a timing diagram for the circuit of FIG. 12 in accordance with the present invention.

Referring to FIG. 12, a schematic diagram of a circuit 60 is shown. Circuit 60 includes a common DATA LINE and three TFTs per pixel 62. Circuit 60 is a 4:1 data demultiplexing representation of circuit 20 of FIG. 3. Scan lines G, H, I and J are added to accomplish this. The TFTs M7, M8, M9, M10, M11 and M12 function similarly to TFTs M1, M2, M3, M4, M5 and M6, respectively. CS3 and CS4 function similarly to CS1 and CS2. FIG. 13 illustrates an example of a timing diagram for circuit 60.

Figure 15:
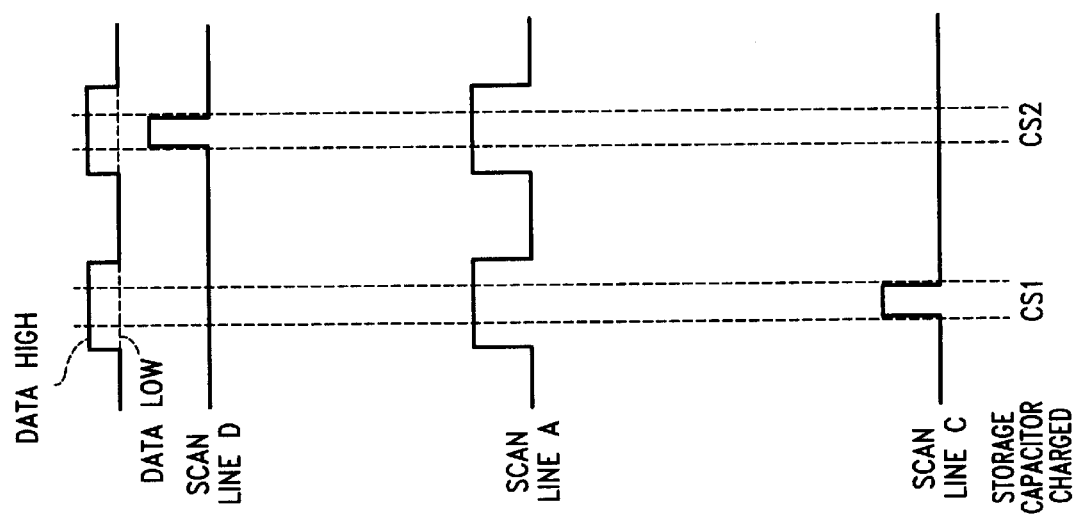
FIG. 15 is a timing diagram for the circuit of FIG. 14 in accordance with the present invention.
Figure 14:
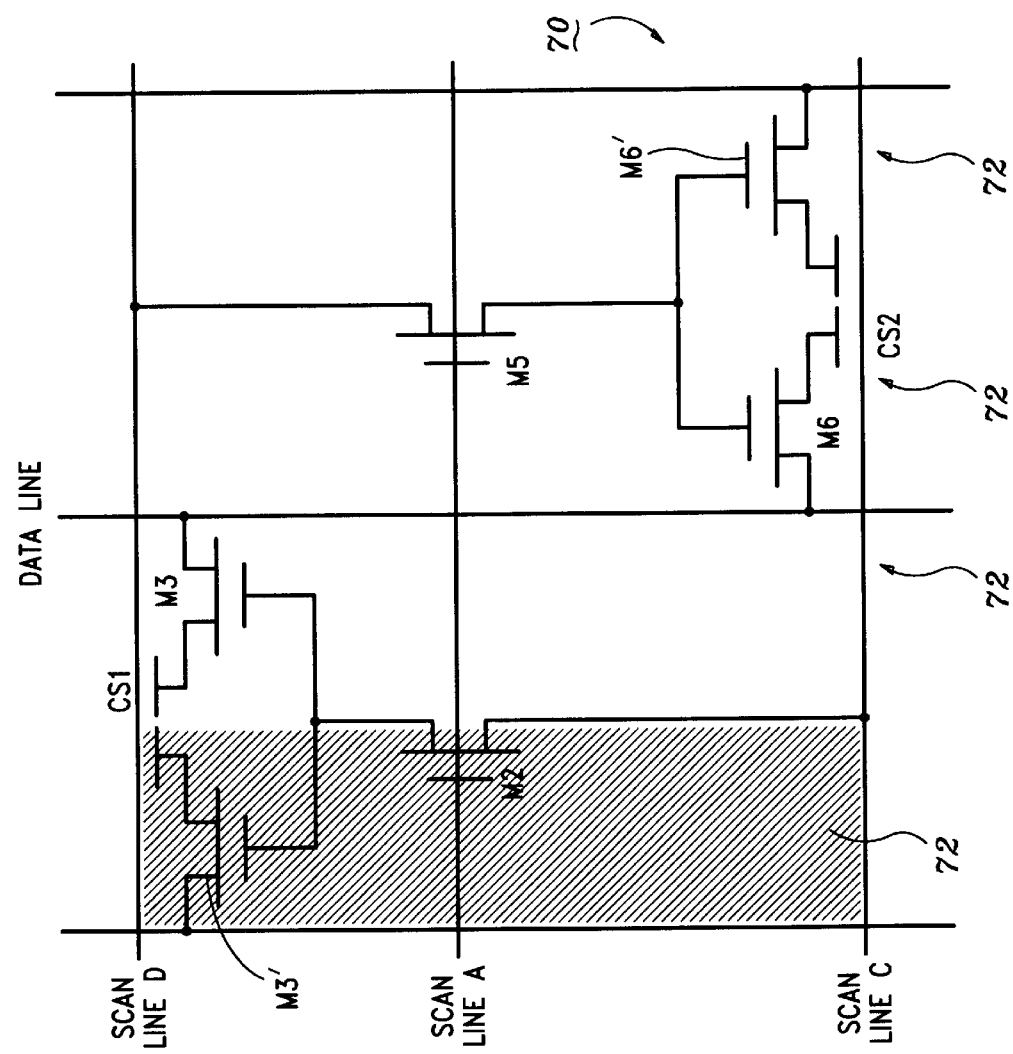
FIG. 14 is a schematic diagram of a pixel circuit effectively having one and one half TFTs per pixel due to a shared TFT between adjacent pixels in accordance with the present invention.

Referring to FIG. 14, a schematic diagram of a circuit 70 is shown which incorporates an efficient one and one half (1½) TFT per pixel layout. Each pixel has two TFTs, however, one TFT is shared between adjacent pixels. A common DATA LINE is used for four pixels 72. Each pixel 72 has its own TFT, namely, M3', M3, M6' and M6 all of which function substantial similarly and as described herein above. Further TFTs M2 and M5 are shared by the two adjacent pixels nearest each TFT. It should be noted that shared TFTs M2 and M5 may be located physically adjacent to, in or nearby pixels 72 which are electrically connected to M2 and M5. Only three scan lines (A, C and D) are employed. FIG. 15 illustrates an example of a timing diagram for circuit 70. In preferred embodiments, transistors, TFTs, are formed on a substrate and pixels are formed over the transistors. This provides a more efficient area layout.

Figure 16:
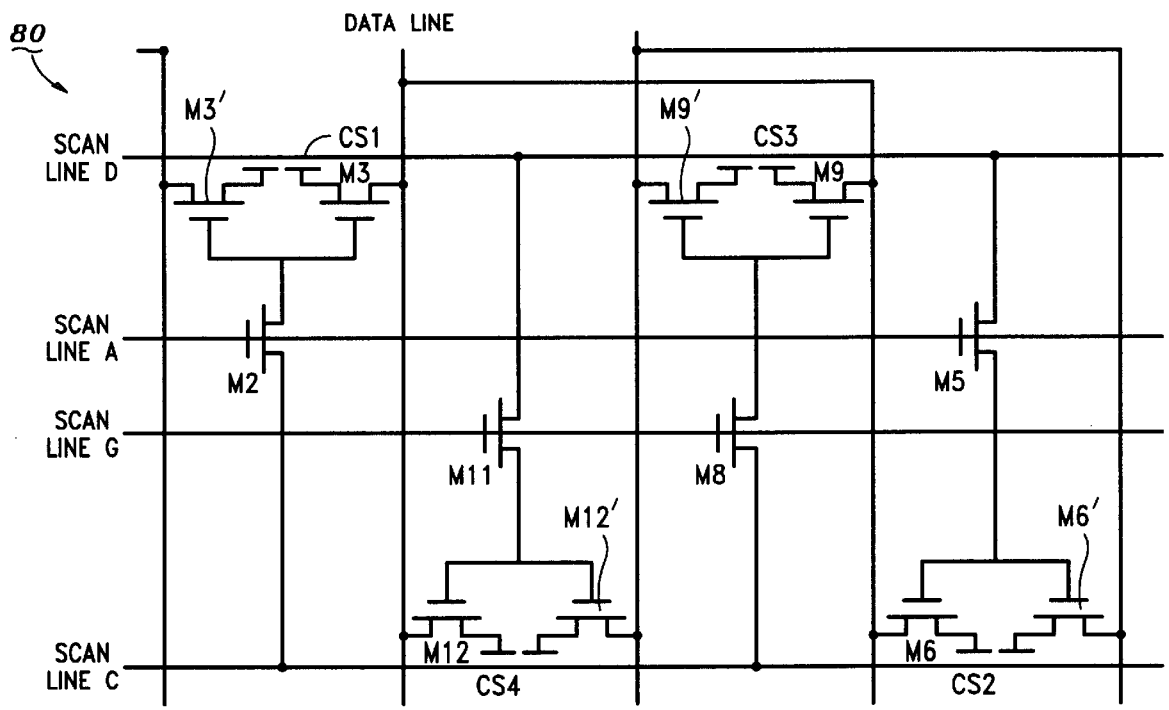
FIG. 16 is a schematic diagram of another pixel circuit having 4:1 data demultiplexing in accordance with the present invention.
Figure 17:
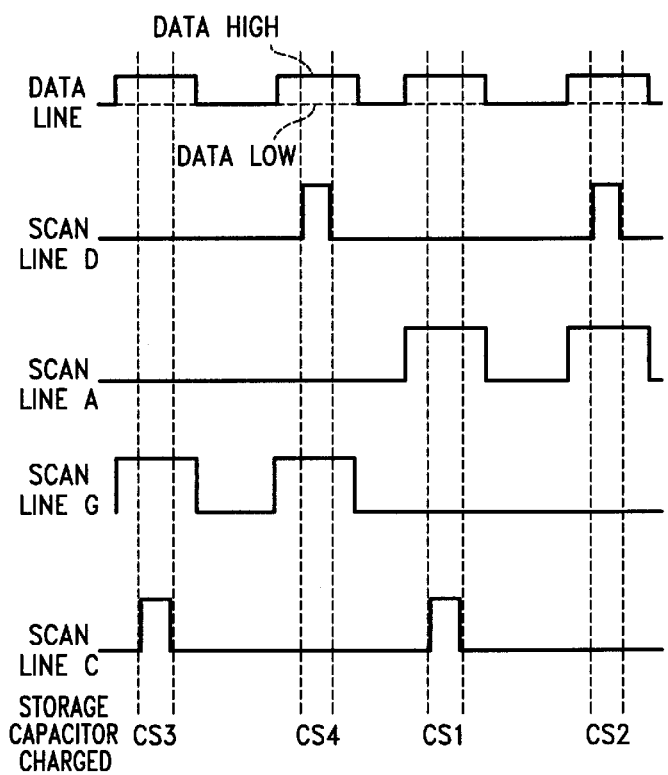
FIG. 17 is a timing diagram for the circuit of FIG. 16 in accordance with the present invention.

Referring to FIG. 16, circuit 70 of FIG. 14 may be implemented as circuit 80 as shown. A scan line G is added to create a 4:1 data demultiplexing scheme in accordance with the present invention. The TFTs M11, M12, M12', M8, M9 and M9' function similarly to TFTs M5, M6, M6', M8, M9, and M9', respectively and as described above. Likewise CS3 and CS4 function similarly as CS1 and CS2. FIG. 17 illustrates an example of a timing diagram for circuit 80. Referring to FIG. 18, another implementation of a circuit in accordance with the present invention is provided with circuit 90. Circuit 90 incorporates an efficient one and one half (1½) TFT per pixel layout. A common DATA LINE is used for four pixels 92. Each pixel 92 has its own TFT, namely, M3, M6, M9 and M12 all of which function substantially similar and as described herein above. Further, TFTs M2, M5 and M11 are shared by adjacent pixels. Only three scan lines (A, C and D) are employed. FIG. 19 illustrates an example of a timing diagram for circuit 90.

Referring to FIGS. 20 and 21, another implementation of a circuit in accordance with the present invention is provided with circuit 100. Circuit 100 includes pixels 102. Each pair of pixels 102 share a data lines M (N) as shown.

Figure 23:
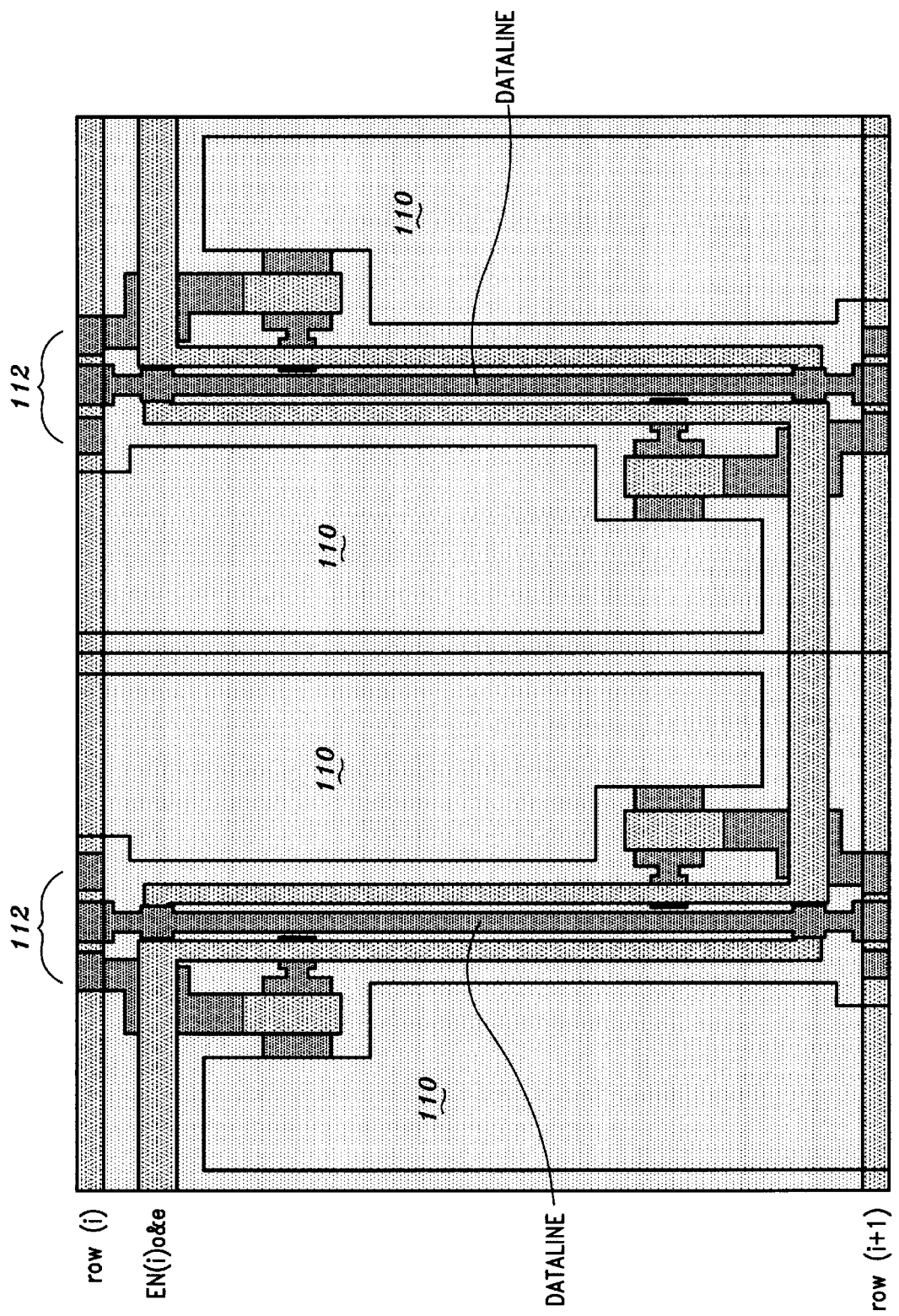
FIG. 23 is a top plan view of another semiconductor device layout implementing the present invention.

Referring to FIGS. 22 and 23, layouts for implementation of circuit 30 are shown. It is understood that the other circuits described above may also be implemented in a similar way. Advantageously, circuit 30 yields a high aperture ratio and provides a reduction in number of both data and gate drivers when compared to the prior art X-Y addressed displays. A common DATA LINE is shown. Scan lines D, A, and C are marked as row(i), EN(i) o&e and row(i+1) respectively. TFTs are indicated as well as pixels. For the layout shown in FIGS. 22 and 23, an aperture ratio of 49.1% is achieved for the dimensions indicated. These dimensions may be varied according to the design, however. In FIG. 23, scan line A (EN(i) o&e) is shown with no crossover with a pixel ITO plate (not shown) to reduce crosstalk.

TABLE 1

X=number of rows

Y =number of columns (i.e., RGB columns)

$R_{xy}$=Y/X information content aperture ratio of a panel (typically 4:3).

| Display Address Type | # of horizontal lines in array | # of vertical lines in array | total # of array connections | total # of array connections for aperture ration 4:3 | total # of array connections for aperture ration 16:9 |
|---|---|---|---|---|---|
| Prior art circuit with separate Cs line | 2X | 3Y or $3R_{xy}$*X | $(2 + 3R_{xy})$*X | 6X | 7.333X |
| Prior art | X | 3Y or $3R_{xy}$*X | $(1 + 3R_{xy})$*X | 5X | ≈6.333X |
| Prior art circuit with Delta RGB pixel layout | 1.5X | 2Y or $2R_{xy}$*X | $(1.5 + 2R_{xy})$*X | ≈4.167X | ≈5.056X |
| Circuit 30 in accordance with the invention | 2X + 1 | 1.5Y or $1.5R_{xy}$*X | $(2 + 1.5R_{xy})$*X | 4X + 1 | ≈4.667X + 1 |

Table 1 illustratively demonstrates a reduction the present invention yields for vertical lines. The result is a 2:1 data demultiplexing effect. The total number of horizontal lines in the display may be increased, however, if this is the case the total number of connections (lines for tabbing external drivers) for the 4:3 or the 16:9 aperture ratio displays are minimized in accordance with the present invention. Further improvements in demultiplexing may be realized if the fanout structure as shown in FIG. 7 is employed. Gate drivers are further reduced in numbers and the data demultiplexing becomes m:1 where m is an integer greater than one and equal to the number of stages implemented as described in FIG. 7.

Referring again to FIGS. 22 and 23, illustrative layouts are shown for an implementation of the present invention.

Pixels 110 are shown with an illustrative aperture ratio of 49.9%. Between rows of pixels a circuit region 112 is provided in accordance with the present invention. Circuit region 112 may include TFTs, scan lines, data lines, storage node lines, connections, etc. as described. Alternately, circuit region 102 may include logic circuitry including AND gates or other logic gates such as OR, NOR, NAND and/or XOR gates. Thus, the selection of control lines such as scan lines will be performed using logic gates having control or enable signals which are logically combined to transmit an appropriate control signal to TFTs. Logic gates may also be included externally to the pixel areas.

Pixels 110 may include a transmissive mode and a reflective mode. Transmissive mode includes modulating light from a surface of pixel 110 by modulating a capacitive voltage to the pixel to transmit light directly therefrom. Reflective mode includes preparing the pixel to modulate light therefrom by reflecting light incident on its surface.

It is to be understood that the present invention may be implemented with various semiconductor technologies, for example crystalline silicon, amorphous silicon, polysilicon, organic materials, Si—Ge and/or CdS. The embodiments of the present invention may be implemented on any active matrix display without impacting conventional fabrication processes. In preferred embodiments, the displays are used in lap top computers, desk top monitors or other electronic devices having LCDs. Also, in preferred embodiments, pixels are formed over the transistors. This provides a more efficient area layout. Further, the present invention implements multiplexing/demultiplexing capability while reducing components and cost.

Having described preferred embodiments of multiplexing pixel circuits (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An active matrix display comprising:
   a plurality of pixels arranged in an array;
   at least two transistors associated with each pixel, the transistors positioned within the array for switching the pixels on and off according to data and gate signals; and
   at least two scan lines coupled to one of the at least two transistors of each pixel such that the scan lines provide gate signal multiplexing, wherein the scan lines are coupled to the transistors by a low impedance path.

2. The display as recited in claim 1, wherein one of the at least two transistors is shared between adjacent pixels.

3. The display as recited in claim 1, wherein the pixels modulate light in a transmissive mode.

4. The display as recited in claim 1, wherein the pixels modulate light in a reflective mode.

5. The display as recited in claim 1, wherein the array includes rows and columns and the control lines select the pixels in different rows simultaneously.

6. The display as recited in claim 5, wherein the control lines include data lines and the simultaneously selected pixels share a data line.

7. The display as recited in claim 5, wherein the control lines include data lines and the simultaneously selected pixels each use a different data line.

8. The display as recited in claim 1, wherein the control lines includes scan lines.

9. The display as recited in claim 1, wherein the control lines include capacitance storage lines.

10. The display as recited in claim 1, wherein the low impedance path includes one of a metal, a doped amorphous silicon and polycrystalline silicon.

11. The display as recited in claim 1, wherein the low impedance path includes a capacitor.

12. The display as recited in claim 1, wherein the display includes a liquid crystal display.

13. The display as recited in claim 1, wherein the transistors include thin film transistors.

14. The display as recited in claim 1, further comprising logic circuitry for controlling the multiplexing in accordance with control signals.

15. An active matrix display comprising:
   a plurality of pixels arranged in an array including rows and columns;
   at least two transistors associated with each pixel, the transistors positioned within the array for switching the pixels on and off;
   a plurality of data lines running substantially parallel to the columns;
   a plurality of scan lines running substantially parallel to the rows; and
   the data lines and scan lines being coupled to the transistors of the pixels such that the data lines provide data multiplexing for each pixel and at least two scan lines coupled to one of the at least two transistors provide gate multiplexing for each pixel, wherein the data lines and scan lines are coupled to the transistors by a low impedance path.

16. The display as recited in claim 15, wherein the data multiplexing includes L:1 multiplexing where L is an integer greater than one.

17. The display as recited in claim 15, wherein the gate multiplexing includes m:1 multiplexing where m is an integer greater than one.

18. The display as recited in claim 15, wherein one of the at least two transistors is shared between adjacent pixels.

19. The display as recited in claim 15, wherein the pixels modulate light in a transmissive mode.

20. The display as recited in claim 15, wherein the pixels modulate light in a reflective mode.

21. The display as recited in claim 15, wherein the data lines select pixels in different rows simultaneously.

22. The display as recited in claim 15, wherein the pixels share a data line.

23. The display as recited in claim 15, wherein the pixels each have a different data line.

24. The display as recited in claim 15, wherein the scan lines include capacitance storage lines.

25. The display as recited in claim 15, wherein the low impedance path includes a capacitor.

26. The display as recited in claim 15, wherein the display includes a liquid crystal display.

27. The display as recited in claim 15, wherein the transistors include thin film transistors.

28. The display as recited in claim 15, further comprising logic circuitry for controlling the multiplexing in accordance with control signals.

29. An active matrix display comprising:
   a plurality of pixels arranged in an array;
   at least two transistors associated with each pixel, the transistors positioned within the array for switching the pixels on and off according to data and gate signals, the transistors being disposed on a substrate and having the pixels formed over the transistors; and at least two scan lines coupled to one of the at least two transistors of each pixel such that the scan lines provide gate signal multiplexing, wherein the scan lines are coupled to the transistors by a low impedance path.

30. The display as recited in claim 29, wherein one of the at least two transistors is shared between adjacent pixels.

31. The display as recited in claim 29, wherein the pixels modulate light in a transmissive mode.

32. The display as recited in claim 29, wherein the pixels modulate light in a reflective mode.

33. The display as recited in claim 29, wherein the array includes rows and columns and the control lines select the pixels in different rows simultaneously.

34. The display as recited in claim 33, wherein the control lines include gate lines and the simultaneously selected pixels share a data line.

35. The display as recited in claim 33, wherein the control lines include gate lines and the simultaneously selected pixels each have a different data line.

36. The display as recited in claim 29, wherein the control lines includes scan lines.

37. The display as recited in claim 29, wherein the control lines include capacitance storage lines.

38. The display as recited in claim 29, wherein the low impedance path includes one of a metal, a doped amorphous silicon and polycrystalline silicon.

39. The display as recited in claim 29, wherein the low impedance path includes a capacitor.

40. The display as recited in claim 29, wherein the display includes a liquid crystal display.

41. The display as recited in claim 29, wherein the transistors include thin film transistors.

42. The display as recited in claim 29, further comprising logic circuitry for controlling the multiplexing in accordance with control signals.

* * * * *